Aug. 9, 1966 P. RUETSCHI 3,265,534
ELECTRIC BATTERY
Filed Nov. 6, 1963 2 Sheets-Sheet 1

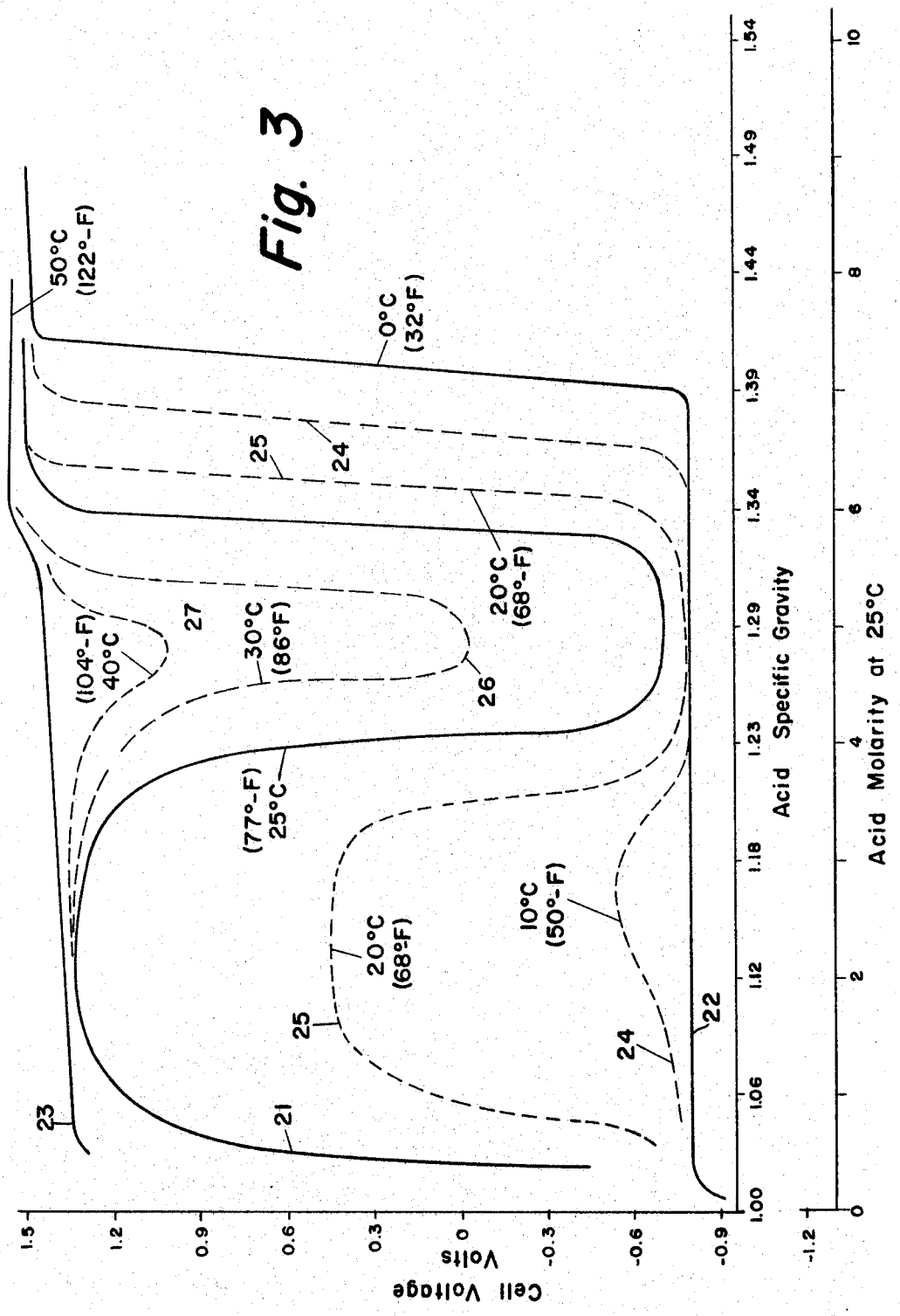

3,265,534
ELECTRIC BATTERY
Paul Ruetschi, Yardley, Pa., assignor to The Electric Storage Battery Company, a corporation of New Jersey
Filed Nov. 6, 1963, Ser. No. 321,942
5 Claims. (Cl. 136—26)

This invention relates to cells of the rechargeable type and has for an object the provision of a cell including antimony as the negative electrode together with an electrolyte of sulfuric acid of such concentration as to prevent dips in the discharge voltage curve.

Though it has been proposed to construct cells with antimony forming the negative electrode and with various materials for the positive electrode, such cells have wholly unsatisfactory performance characteristics within the temperature range likely to be encountered in most applications.

More specifically, it has been found that cells which include negative electrodes of antimony with electrolytes of sulfuric acid of conventional specific gravity have a discharge voltage characteristic related to the temperature of operation of the cell and which at certain temperatures shows a marked decrease, 50% and more, of voltage during the initial and important part of the load-demand placed on the battery. Thus batteries with antimony negative electrodes may for an initial period deliver discharge current at the desired voltage level. After a short period of time the discharge voltage rapidly decreases. After a further period of time that voltage level may again rise to useful levels after which the voltage will remain more or less level until the end of the discharge.

It has been further determined that the discharge voltage dips are related to two factors, the operating temperature of the cell and the specific gravity of the electrolyte.

In accordance with the present invention, advantage is taken of the foregoing discoveries and the discharge voltage dip entirely eliminated by providing a sulfuric acid electrolyte of concentration above that at which the discharge voltage dip occurs with battery operating temperatures as low as those likely to be encountered in intended applications of use of such batteries as for example as low as 0° C.

Further in accordance with the present invention, the cells and batteries as a whole may be hermetically sealed by utilizing a concentrated electrolyte immobilized in the electrode assembly, i.e., to provide only the amount of electrolyte which can be absorbed in the porous cell assembly of separator and plates, preferably well below the amount which will saturate the cell assembly.

Since antimony metal has a weight about half that of lead, cells of corresponding capacity can be much lighter. Moreover, from each atom of antimony metal there are available three electrons whereas from an atom of lead there are available only two electrons. Though antimony is more expensive than lead, it will be seen that the foregoing advantages provide an offset for the additional cost of antimony. A cell made in accordance with this invention on a price basis will approach that of conventional lead acid batteries and will be much less for the same capacity than for nickel-cadmium batteries.

For further objects and advantages of the invention and for detailed instructions as to how to practice the same, reference is to be had to the following description taken in conjunction with the accompanying drawings, in which:

FIG. 3 illustrates performance curves of cells in terms of specific gravity of their electrolyte.

Figure 1:
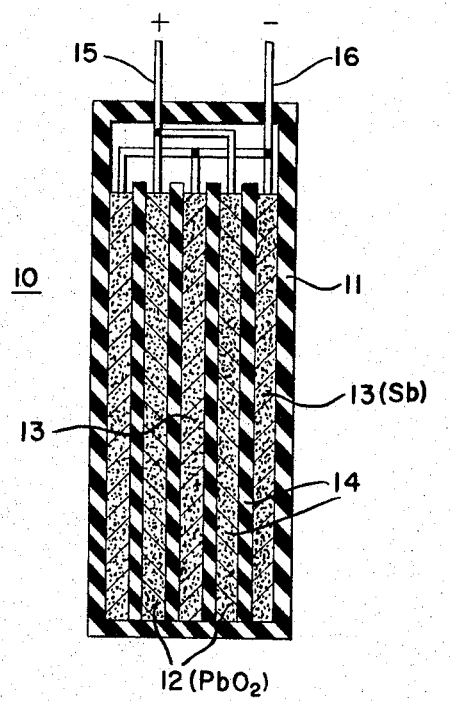
FIG. 1 is a sectional view of a typical cell embodying the invention.

Referring now to FIG. 1, the invention in one form has been shown applied to a sealed dry cell 10 having a sealed housing or casing 11, positive plates 12 of lead peroxide, negative plates 13 of antimony, and flat, rib-free microporous separators 14 interposed between the positive and negative plates. The plates 12 forming the positive electrode of the cell 10 have as their charged active material lead dioxide ($PbO_2$). Though they can be made of thin sheets of anodized lead or formed from compressed lead dioxide powder, they are more conveniently constructed by utilizing conventional lead pasting materials heretofore utilized in lead acid batteries for the positive plates. Thus, such a paste may comprise a mixture of charged lead positive material which may be referred to as lead dioxide or lead peroxide, water and sulfuric acid. This paste is then pressed into a grid of lead antimony alloy.

The plates 13 forming the negative electrode may comprise sheets of metallic antimony of desired size and thickness though they are preferably constructed by utilizing a pastable mixture of antimony trioxide which is pressed into a grid of antimony metal or antimony alloys. In some instances a grid of expanded silver may be used. The resultant plate is then formed in a solution of sulfuric acid to convert the antimony trioxide to spongy antimony metal. Any silver oxides present in the silver powder are converted to silver metal. The sulfuric acid solution may have a specific gravity of about 1.260.

The positive plates are similarly formed and charged in a sulfuric acid electrolyte to convert the active material of the positive plates to lead dioxide. The plates are assembled together with porous separators therebetween. These separators may be of conventional porous materials inert to sulfuric acid. The positive plates are connected in parallel and to the positive output terminal 15. Similarly, the negative plates are connected in parallel and to the negative output terminal 16.

Figure 2:
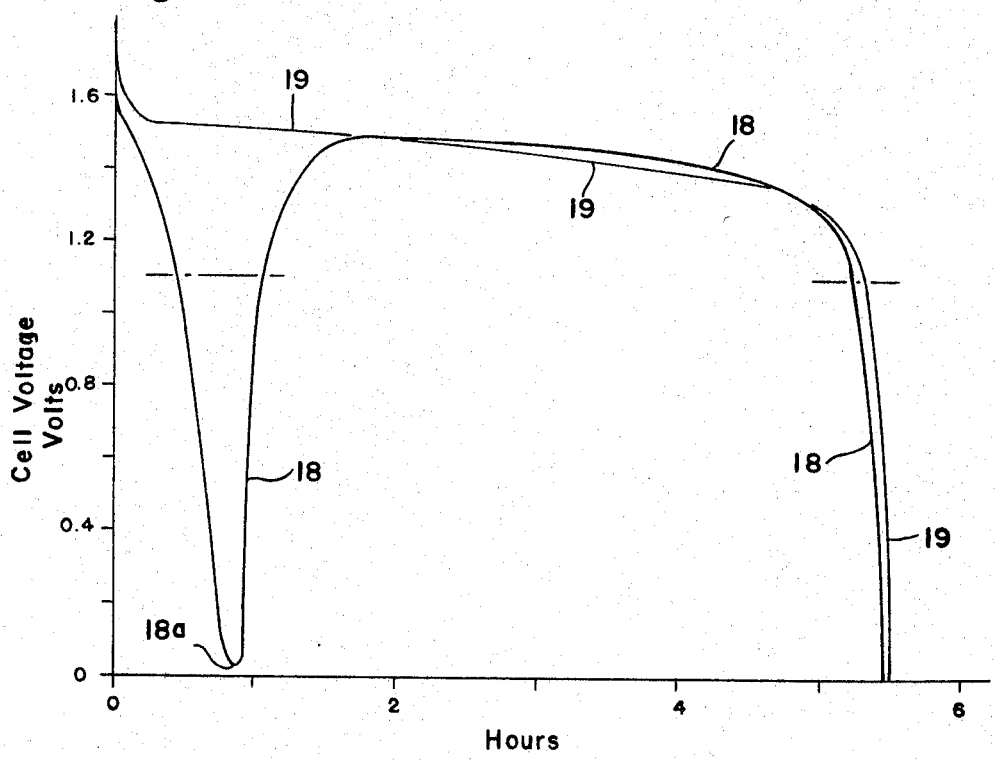
FIG. 2 is a graph useful in explaining comparative performance of the present cell as against a similar cell in which the electrodes are immersed in a bath of free electrolyte.

In accordance with the present invention, the cells, after the forming of the plates, are filled with electrolyte of sulfuric acid having a specific gravity above about 1.300 and preferably below 1.440. By reason of the high gravity of the sulfuric acid electrolyte, there is avoided entirely the discharge voltage dip illustrated by the graph 18 of FIG. 2. The graph 18 may be taken as exemplary of the voltage dips for cells with antimony electrodes where the concentration of the sulfuric acid is below about 1.300 and the temperature is of the order of 70° F. to 80° F. More particularly, if a discharge be initiated, it will be seen the voltage decreases from its open circuit value of about 1.6 volts and with time rapidly diminishes, approaching zero as a limit. Thereafter the voltage rises and again attains a normal value for the particular constant discharge rate of 2 amperes. This constant-current discharge is produced in conventional manner by an external source and a current regulator.

The graph 19 illustrates a discharge curve at a 2-ampere rate made immediately after the cell had received a full charge. This discharge curve 19 does not exhibit the undesired voltage dip and for reasons which will later be explained. Since the battery was discharged immediately after completing the charging cycle, the internal temperature thereof was over 40° C., thus taking advantage of the lack of dip as will be explained below in connection with FIG. 3.

In accordance with the present invention and on the basis of extensive research and a multiplicity of tests there are achieved desirable characteristic curves which do not exhibit a dip at temperatures at which these dips would otherwise occur. Heretofore little has been known about the nature of basic antimony sulfates formed as a result of discharge of negative electrodes of antimony. We have found that basic antimony sulfates formed on discharge of negative electrodes may take many forms. The crystalline structures widely differ. The chemical compositions also widely differ. There have been identified some of the basic antimony sulfates as follows:

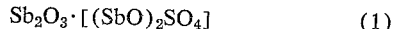
$$Sb_2O_3 \cdot [(SbO)_2SO_4] \qquad (1)$$

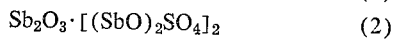
$$Sb_2O_3 \cdot [(SbO)_2SO_4]_2 \qquad (2)$$

$$[(SbO)_2 \cdot SO_4]_6 \qquad (3)$$

The first of the antimony sulfates listed above takes two crystalline forms, and so does the last of the antimony sulfates listed above. Thus there are at least five crystalline forms of the antimony sulfates. These have been identified by X-ray diffraction and microphotography.

I have found that the formation of particular antimony sulfates and particular crystalline forms of such antimony sulfates depends upon the concentration of the sulfuric electrolyte and the temperature of the cell. If for a given temperature the concentration of the electrolyte be selected to within the range above about 1.300, the basic antimony sulfates and the crystalline forms produced at the negative electrode during discharge will be those which do not cause passivation. In this manner, there are avoided voltage dips as exemplified by the above graph 18 of FIG. 2. I have further discovered that passivation will not appear if the temperature of the cell be maintained very high, as for example in the neighborhood of 120° F., and above.

The graphs of FIG. 3 will be useful in applying the present invention to antimony-lead batteries. These graphs have been plotted with cell voltage as ordinates and specific gravity of the electrolyte as abscissae, the decimal values of specific gravity representing grams per cubic centimeter. These graphs were obtained by disposing the negative electrode of antimony in a bath of sulfuric acid electrolyte, the concentration of which was changed for each different experiment. Two large positive electrodes of excess capacity were utilized with the negative electrode so that the graphs of FIG. 3 are truly representative of the change in voltage due to the action of the negative electrode during discharge. The voltage represented by each graph for a given concentration of electrolyte corresponds with the lowest voltage occurring within the first two hours of discharge. If a dip in the discharge voltage did occur, the lowest voltage at the bottom of the dip was taken as the critical value used to prepare the curves of FIG. 3.

With a bath of electrolyte at a temperature of 25° C. (77° F.), it will be seen from graph 21 that the voltage with increasing specific gravity of the electrolyte rapidly rises from a negative value of around −0.5. When the specific gravity is about 1.12 the voltage attains a maximum of about 1.30 volts after which with increasing specific gravity the voltage declines to zero and thence reverses in polarity until it attains a negative value in excess of −0.6. In the region of acid concentrations above about 1.33 specific gravity, the voltage rapidly rises. At about 1.36 specific gravity the voltage rises to the relatively high value of about 1.4. Thus the graph 21 represents dramatic evidence of the change in voltage with change in acid concentration of the electrolyte at a temperature of 25° C.

With an electrolyte temperature of 0° C. the graph 22 demonstrates the lack of any useful voltage with specific gravities of the electrolyte below about 1.39. The voltage is of the order of −0.8 volt until the acid concentration has been increased to a specific gravity above about 1.39. The sensitivity of voltage to acid concentration is very great. At a specific gravity of 1.42 the cell develops a relatively high value of 1.4 volts.

In contrast with the above, if the electrolyte be maintained at the relatively high temperature of 50° C. (122° F.), it will be seen by the graph 23 that the voltage rises somewhat with increased concentration of the acid electrolyte and further, that the voltage dip does not appear. However, there are few if any applications where the electrode temperatures and cells will be maintained at such high temperatures. Accordingly, in order to achieve satisfactory operation the concentration of the acid electrolyte in accordance with the present invention will always be above about 1.30, preferably above about 1.330.

The broken line graphs 24, 25, 26 and 27 are to be taken as suggestive of characteristic curves since these have not been based upon actual experimental data but represent interpolation of data as between the experimentally derived graphs 21, 22 and 23.

As applied to batteries such as illustrated in FIG. 1 where there are utilized a plurality of positive and negative plates together with intervening separators, it is to be understood that the flow of discharge current results in a temperature rise within the battery due to the internal resistance of the battery. Though this be of a low order, it cannot be neglected in considering its effect in developing heat and the resultant temperature rise of the battery. Moreover, in discharging the antimony negative electrode, in addition to ohmic heat effects, further heat might be generated by the chemical reaction energies involved in the heat of formation of basic antimony sulfates. It must be pointed out that the experimental conditions used to obtain the data of FIG. 3 were such that the indicated temperatures were in fact those encountered in the interior of the assembly.

Accordingly the graphs of FIG. 3 are to be utilized in reference to temperature of the negative electrode during conditions of discharge for the selection of the needed specific gravity of the electrolyte. The ambient temperature may widely differ from these internal temperatures to which the graphs of FIG. 3 refer.

For lower ambient temperatures, freezing and below, the acid concentration will have to be higher and may be as high as 1.42 and above in order to avoid dips. For increasing ambient temperatures the acid concentrations may be less. These ambient temperature conditions will, of course, affect the temperature of the negative electrode inside the battery during discharge. Immediately upon flow of current the temperature of the negative electrode will rise and the extent of that rise will depend upon a number of factors which may widely differ depending upon the particular application of the battery and its design for that application. Thus, for a storage battery in which it is desired to utilize a bath of electrolyte with a liquid level to cover the plates, the temperature rise will be much smaller because of the large heat capacity of the bath of electrolyte. The internal resistance will also be lower and the rate of heat generation correspondingly decreased. On the other hand, for a sealed battery in which the electrode assembly of each cell includes two or more microporous separators partly saturated with electrolyte, the temperature rise will be greater and the internal temperature will more widely differ from the ambient temperature after a few minutes of discharge. As a matter of fact, it is considered that the regeneration of the voltage in the cell after the dip as illustrated in graph 18 of FIG. 2 may be attributed to the utilization of the discharge current in generation of heat. In the region of minimum voltage 18a the potential drop was of the order of one and one-half volts or more, thus indicating a rising internal resistance, and thus increased $I^2R$ losses which losses produce the increased generation of heat.

From the foregoing it will be seen that the internal generation of heat decreases the requirements in respect to the acid concentration of the electrolyte. If a battery of the free electrolyte type (i.e., the plates submerged) be utilized for temperatures of 25° C., then it will be preferred to utilize a concentration of 1.35 and higher.

On the other hand, for the same ambient temperature of 25° C. if a sealed battery with the electrode assembly be partly saturated, a lower specific gravity for the electrolyte may be utilized, as for example, as low as 1.32. In the same manner, for the sealed type of battery, a specific gravity of 1.35 will be suitable for operation of the battery with an ambient temperature as low as 0° C.

Ordinarily the upper limit for the specific gravity may be taken as about 1.45 and for the reason that as the concentration of sulfuric acid is increased, the cycle life of the batteries is shortened. Thus it will ordinarily be preferred to select specific gravities in relation to the heat generation or internal temperature of the battery so that the lower values of specific gravity above about 1.30 will be preferred as against those approaching 1.45 and above.

With the foregoing teachings in mind, those skilled in the art will understand that the internal resistance of the battery as determined by the characteristics of the separators, the volume of the electrolyte, the tightness of the packing, the conductivity of the grids, and the over-all size of the battery will all contribute to the temperature rise attained as discharge begins. Thus, batteries of any desired design may be adapted for a wide variety of ambient temperature conditions by suitably selecting the specific gravity of the sulfuric acid electrolyte for such ambient conditions.

For the sealed cell it is desirable to provide for the negative electrode (negative plates) an excess of active uncharged material as compared with that at the positive electrode at the time of sealing. The excess may be of the order of 20% of the charged capacity of the battery.

As already mentioned, in the sealed cell the amount of concentrated electrolyte added will depend upon the volume and porosity of the electrode assembly including the separators, less than enough to liquid-saturate the same ordinarily being utilized. Additionally, if the electrodes be discharged at the time of addition of the sulfuric acid electrolyte, the specific gravity may be somewhat less than the above minimum of 1.30 since the minimum referred to is for a cell with both electrodes fully charged. As the electrodes are fully charged, the specific gravity of the electrolyte will rise. Moreover, in the sealed cell it is desirable that the separators and electrodes tightly fit within the sealed container, i.e., of construction to produce intimacy of contact between each separator and its associated electrodes. For a two-ampere discharge rate, the electrodes will have proportions of the order of three inches wide and three inches high and of conventional thickness, between 50 and 70 mils.

What is claimed is:
1. A battery cell comprising
 a positive electrode including lead peroxide as the active charged material,
 a negative electrode including in major proportion metallic antimony as the active charged material, and
 a sulfuric acid electrolyte having a specific gravity above about 1.3.

2. A battery cell comprising
 a positive electrode including lead peroxide as the active charged material,
 a negative electrode including in major proportion metallic antimony as the active charged material, and
 means for eliminating discharge voltage dips for ambient operating conditions within the range above 0° C. comprising a sulfuric acid electrolyte the specific gravity of which lies within the range from above 1.30 to about 1.45, the higher the specific gravity the lower the ambient temperature condition of use.

3. An hermetically sealed battery cell having a sealed container for an electrode assembly therein, comprising
 a positive electrode including lead peroxide as the active charged material,
 a negative electrode consisting essentially of metallic antimony as the active charged material, electrical insulating porous separating means interposed between said electrodes,
 said electrodes and said separating means being characterized by the presence therein of a sulfuric acid electrolyte in sufficient quantity to maintain said assembly electrically conductive but insufficient in amount completely to saturate same,
 said sulfuric acid electrolyte being characterized by a specific gravity which for the charged state of said electrodes will lie within the range from above 1.3 to about 1.45.

4. The hermetically sealed battery of claim 3 in which said separating means includes rib-free separators with their opposed faces in intimate contact with said electrodes.

5. The hermetically sealed battery of claim 3 in which said electrode assembly including said electrodes and said separating means are pressed into said sealed container with a tight fit to assure intimacy of contact between said separating means and said electrodes.

References Cited by the Examiner

UNITED STATES PATENTS 3,174,878   3/1965   Peters _____ 136—6

FOREIGN PATENTS 209,341   1/1924   Great Britain.

OTHER REFERENCES

Zachlin: Self Discharge in Lead-Acid Storage Batteries, The Electrochemical Society, Preprint 92–28, 1947, pp. 324 and 334–338, 136-65.

WINSTON A. DOUGLAS, *Primary Examiner.*

D. L. WALTON, *Assistant Examiner.*